United States Patent
Xu et al.

(10) Patent No.: US 11,576,089 B2
(45) Date of Patent: **\*Feb. 7, 2023**

(54) METHOD AND APPARATUS FOR NEGOTIATING SECURITY DURING HANDOVER BETWEEN DIFFERENT RADIO ACCESS TECHNOLOGIES

(71) Applicant: Huawei Technologies Co., Ltd., Shenzhen (CN)

(72) Inventors: Xiaoying Xu, Shanghai (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,633

(22) Filed: Dec. 11, 2020

(65) Prior Publication Data

US 2021/0099923 A1 Apr. 1, 2021

Related U.S. Application Data

(63) Continuation of application No. 16/397,789, filed on Apr. 29, 2019, now Pat. No. 10,869,235, which is a (Continued)

(51) Int. Cl.
*H04L 29/06* (2006.01)
*H04W 36/00* (2009.01)
(Continued)

(52) U.S. Cl.
CPC ........ *H04W 36/0038* (2013.01); *H04B 1/406* (2013.01); *H04L 9/14* (2013.01);
(Continued)

(58) Field of Classification Search
None
See application file for complete search history.

(56) References Cited

U.S. PATENT DOCUMENTS 5,598,459 A  1/1997  Haartsen
6,370,380 B1  4/2002  Norefors et al.
(Continued)

FOREIGN PATENT DOCUMENTS

EP   1764933 A1   3/2007
WO   2006022469 A1   3/2006
WO   2006124347 A2   11/2006

OTHER PUBLICATIONS

"3rd Generation Partnership Project; Technical Specification Group Services and System Aspects; 3GPP System Architecture Evolution: GPRS enhancements for E-UTRAN access (Release 8)," 3GPP TS 23.401 V0.4.1, 3rd Generation Partnership Project, Valbonne, France (Apr. 2007).

(Continued)

*Primary Examiner* — Maung T Lwin
(74) *Attorney, Agent, or Firm* — Leydig, Voit & Mayer, Ltd.

(57) ABSTRACT

A solution for security negotiation during handover of a user equipment (UE) between different radio access technologies is provided. In the solution, the UE receives non-access stratum (NAS) security information and access stratum (AS) security information which are selected by the target system and then performs security negotiation with the target system according to the received NAS security information and AS security information. As such, the UE may obtain the key parameter information of the NAS and AS selected by a Long Term Evolution (LTE) system and perform security negotiation with the LTE system when the UE hands over from a different system, such as a Universal Terrestrial Radio Access Network (UTRAN), to the LTE system.

25 Claims, 5 Drawing Sheets

Related U.S. Application Data continuation of application No. 15/589,687, filed on May 8, 2017, now Pat. No. 10,299,116, which is a continuation of application No. 14/667,099, filed on Mar. 24, 2015, now Pat. No. 9,686,678, which is a continuation of application No. 14/079,350, filed on Nov. 13, 2013, now Pat. No. 9,578,496, which is a continuation of application No. 12/617,175, filed on Nov. 12, 2009, now Pat. No. 8,611,949, which is a continuation of application No. PCT/CN2008/070962, filed on May 14, 2008.

(51) Int. Cl.

| | | |
|---|---|---|
| *H04W 12/041* | (2021.01) | |
| *H04W 12/108* | (2021.01) | |
| *H04W 12/0431* | (2021.01) | |
| *H04B 1/403* | (2015.01) | |
| *H04W 88/06* | (2009.01) | |
| *H04L 9/14* | (2006.01) | |
| *H04W 36/08* | (2009.01) | |
| *H04L 9/40* | (2022.01) | |
| *H04W 48/18* | (2009.01) | |
| *H04W 88/08* | (2009.01) | |

(52) U.S. Cl.
CPC .............. *H04L 63/06* (2013.01); *H04L 63/10* (2013.01); *H04W 12/041* (2021.01); *H04W 12/0431* (2021.01); *H04W 12/108* (2021.01); *H04W 36/0022* (2013.01); *H04W 36/08* (2013.01); *H04W 88/06* (2013.01); *H04L 2209/24* (2013.01); *H04W 48/18* (2013.01); *H04W 88/08* (2013.01)

(56) References Cited

U.S. PATENT DOCUMENTS

| | | | |
|---|---|---|---|
| 6,587,680 B1 | 7/2003 | Ala-Laurila et al. | |
| 7,020,455 B2 | 3/2006 | Krishnarajah et al. | |
| 7,065,340 B1 | 6/2006 | Einola et al. | |
| 7,236,791 B2 * | 6/2007 | Chambers | H04W 72/10 |
| | | | 455/445 |
| 7,366,524 B2 | 4/2008 | Watanabe et al. | |
| 7,437,158 B2 | 10/2008 | Russell | |
| 7,486,952 B1 | 2/2009 | Davies et al. | |
| 7,778,260 B2 | 8/2010 | Sturniolo et al. | |
| 7,948,918 B2 | 5/2011 | Yaqub | |
| 8,023,658 B2 | 9/2011 | Yang et al. | |
| 8,144,877 B2 | 3/2012 | Yang et al. | |
| 8,300,827 B2 | 10/2012 | Yang et al. | |
| 8,340,626 B2 | 12/2012 | Edge | |
| 8,611,949 B2 | 12/2013 | Xu et al. | |
| 8,655,408 B2 * | 2/2014 | Keevill | H04L 12/5692 |
| | | | 455/561 |
| 8,774,759 B2 | 7/2014 | He | |
| 9,031,240 B2 | 5/2015 | Yang et al. | |
| 9,071,962 B2 | 6/2015 | Janakiraman et al. | |
| 9,167,486 B2 | 10/2015 | Bachmann et al. | |
| 2002/0066011 A1 * | 5/2002 | Vialen | H04W 12/02 |
| | | | 380/247 |
| 2002/0098840 A1 | 7/2002 | Hanson et al. | |
| 2003/0033518 A1 | 2/2003 | Faccin et al. | |
| 2004/0162055 A1 | 8/2004 | Wu | |
| 2004/0228491 A1 | 11/2004 | Wu | |
| 2004/0248615 A1 * | 12/2004 | Purkayastha | H04W 36/0066 |
| | | | 455/552.1 |
| 2004/0266435 A1 | 12/2004 | De Jong et al. | |
| 2005/0030923 A1 | 2/2005 | Stuempert et al. | |
| 2005/0063400 A1 | 3/2005 | Lum | |
| 2005/0111666 A1 | 5/2005 | Blom et al. | |
| 2005/0163077 A1 * | 7/2005 | Suda | H04W 92/20 |
| | | | 370/331 |
| 2005/0177723 A1 | 8/2005 | Huang et al. | |
| 2005/0193309 A1 | 9/2005 | Grilli et al. | |
| 2006/0002329 A1 | 1/2006 | Madour | |
| 2006/0009213 A1 | 1/2006 | Sturniolo et al. | |
| 2006/0083201 A1 | 4/2006 | He et al. | |
| 2006/0140410 A1 | 6/2006 | Aihara | |
| 2006/0146752 A1 | 7/2006 | Jang et al. | |
| 2006/0233376 A1 | 10/2006 | Forsberg et al. | |
| 2006/0276190 A1 | 12/2006 | Shaheen | |
| 2007/0036109 A1 | 2/2007 | Kwak et al. | |
| 2007/0060127 A1 | 3/2007 | Forsberg | |
| 2007/0064647 A1 | 3/2007 | Prasad | |
| 2007/0072635 A1 * | 3/2007 | Zhao | H04W 12/106 |
| | | | 455/502 |
| 2007/0157027 A1 | 7/2007 | Palekar et al. | |
| 2007/0173283 A1 | 7/2007 | Livet et al. | |
| 2007/0207806 A1 | 9/2007 | Shaheen | |
| 2007/0213060 A1 * | 9/2007 | Shaheen | H04W 36/125 |
| | | | 455/436 |
| 2007/0280175 A1 | 12/2007 | Cheng et al. | |
| 2007/0297367 A1 | 12/2007 | Wang et al. | |
| 2008/0101311 A1 | 5/2008 | Bernhard et al. | |
| 2008/0184032 A1 * | 7/2008 | Li | H04W 12/0431 |
| | | | 713/171 |
| 2008/0198822 A1 | 8/2008 | Magnusson et al. | |
| 2008/0233941 A1 | 9/2008 | Jen et al. | |
| 2008/0233947 A1 | 9/2008 | Herrero-Veron | |
| 2008/0240439 A1 | 10/2008 | Mukherjee et al. | |
| 2009/0135758 A1 * | 5/2009 | Alper | H04W 40/246 |
| | | | 370/328 |
| 2009/0271623 A1 | 10/2009 | Forsberg et al. | |
| 2010/0190500 A1 | 7/2010 | Choi et al. | |
| 2010/0202618 A1 | 8/2010 | Yang et al. | |
| 2011/0080875 A1 | 4/2011 | Yang et al. | |
| 2011/0310849 A1 | 12/2011 | Yang et al. | |
| 2012/0159151 A1 | 6/2012 | Janakiraman et al. | |
| 2012/0164979 A1 | 6/2012 | Bachmann et al. | |
| 2012/0224564 A1 | 9/2012 | Paisal et al. | |
| 2012/0307803 A1 | 12/2012 | Yang et al. | |
| 2013/0044709 A1 | 2/2013 | Adjakple et al. | |
| 2013/0195268 A1 | 8/2013 | Norrman et al. | |
| 2013/0269001 A1 | 10/2013 | Janakiraman et al. | |
| 2015/0208240 A1 | 7/2015 | Yang et al. | |

OTHER PUBLICATIONS

"3rd Generation Partnership Project; Technical Specification Group GSM/EDGE Radio Access Network; Packet-switched handover for GERAN A/Gb mode; Stage 2 (Release 7)," 3GPP TS 43.129 V7.1.0, 3rd Generation Partnership Project, Valbonne, France (Feb. 2007).

"Pseudo-Change Request to TR 33.821v0.1.0: Update of section 7.4.13 on security algorithm negotiation in SAE/LTE," 3GPP TSG SA WG3 Security—SA3#46b, Sophia Antipolis, France, S3-070233, pp. 1-14, 3rd Generation Partnership Project, Valbonne, France (Mar. 28-29, 2007).

"Universal Mobile Telecommunications System (UMTS); 3G security; Security architecture (3GPP TS 33.102 version 7.1.0 Release 7)," ETSI TS 133 102 Version 7.1.0, European Telecommunications Standards Institute, XP14040243, pp. 1-65, 3rd Generation Partnership Project, Valbonne, France (Dec. 2006).

"2G to LTE IRAT Handover," 3GPP TSG SA WG2 Architecture—S2#57 Rel-8, Beijing, China, S2-072160, XP50259824A, pp. 1-7, 3rd Generation Partnership Project, Valbonne, France (Apr. 23-27, 2007).

"3rd Generation Partnership Project; Technical Specification Group Services and System Aspects; Rationale and track of security decisions in Long Term Evolved (LTE) RAN/3GPP System Architecture Evolution (SAE) (Release 8)," 3GPP TR 33.821 V0.2.0, XP50376898A, 3rd Generation Partnership Project, Valbonne, France (Apr. 2007).

"Selecting and signaling the security algorithms in handover from Rel-8 UTRAN to E-UTRAN," Change Request, 3GPP TSG-SA2 Meeting #62 Marina Del Ray, USA, S2-080939, XP50210510A, 3rd Generation Partnership Project, Valbonne, France (Jan. 14-18, 2007).

(56) References Cited

OTHER PUBLICATIONS

Priority Document PCT/EP2007/061223 corresponding to U.S. Appl. No. 60/852,967, filed Mar. 10, 2008.
Priority Document PCT/KR2007/004600 corresponding to Indian Patent Application No. 1800/CHE/2006 (Dec. 27, 2007).
'Updated version of "Rationale and track of security decisions in Long Term Evolved RAN/3GPP System Architecture Evolution'," 3GPP TSG SA WG3 Security-SA3#44, Tallinn, Estonia, Draft S3-060564, 3rd Generation Partnership Project, Valbonne, France (Jul. 11-14, 2006).
"Selecting and signaling the security algorithms in handover from Rel-8 UTRAN to E-UTRAN," Change Request, 3GPP TSG-SA2 Meeting #62, Marina Del Ray, California, S2-080939, 3rd Generation Partnership Project, Valbonne, France (Jan. 14-18, 2007).
"3rd Generation Partnership Project; Technical Specification Group Radio Access Network; Evolved Universal Terrestrial Access (E-UTRA) and Evolved Universal Terrestrial Access Network (E-Utran); S1 Application Protocol S1AP)(Release 8)," 3GPP TS 36.413, V0.0.0, 3rd Generation Partnership Project, Valbonne, France (Jan. 2007).
"3rd Generation Partnership Project; Technical Specification Group Services and System Aspects; 3G Security Specification of the 3GPP Confidentiality and Integrity Algorithms; Document 1:f8 and f9 Specification (Release 6)," 3GPP TS 35.201, V6.1.00, pp. 1-22, 3rd Generation Partnership Project, Valbonne, France (Sep. 2005).
Priority Document CN 101304600 (A) corresponding to Chinese Patent Application No. 1 CN2007174333 (May 8, 2007).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall iescription; Stage 2(Release 8)," 3GPP TS 36 300 V8.0.0, 3rd Generation Partnership Project, Valbonne, France (Mar. 2007).
"Update on Mobility, Security, Random Access Procedure, etc." 3GPP TSG-RAN2 Meeting #58 Kobe, Japan, R2-072338, 3rd Generation Partnership Project, Valbonne, France (May 7-11, 2007).

\* cited by examiner

METHOD AND APPARATUS FOR NEGOTIATING SECURITY DURING HANDOVER BETWEEN DIFFERENT RADIO ACCESS TECHNOLOGIES

CROSS REFERENCE TO RELATED APPLICATIONS

This application is a continuation of U.S. patent application Ser. No. 16/397,789, filed on Apr. 29, 2019, which is a continuation of U.S. patent application Ser. No. 15/589,687, filed on May 8, 2017, now U.S. Pat. No. 10,299,116, which is a continuation of U.S. patent application Ser. No. 14/667,099, filed on Mar. 24, 2015, now U.S. Pat. No. 9,686,678, which is a continuation of U.S. patent application Ser. No. 14/079,350, filed on Nov. 13, 2013, now U.S. Pat. No. 9,578,496, which is a continuation of U.S. patent application Ser. No. 12/617,175, filed on Nov. 12, 2009, now U.S. Pat. No. 8,611,949, which is a continuation of International Patent Application No. PCT/CN2008/070962, filed on May 14, 2008, which claims priority to Chinese Patent Application No. 200710099176.7, filed on May 15, 2007. All of the aforementioned patent applications are hereby incorporated by reference in their entireties.

FIELD OF THE INVENTION

The present invention relates to mobile communication, and in particular, to a method and apparatus for negotiating security during handover between different radio access technologies.

BACKGROUND

In a mobile communication system, a User Equipment (UE) generally needs to handover between base stations when moving from a local base station to a target base station. The Radio Access Networks (RANs) of base stations include: Second Generation (2G) system, Third Generation (3G) system, and the Long Term Evolution (LTE) system to be launched in the future. The security protection levels and protection measures between a UE and a RAN are different from those between the UE and another RAN.

FIG. 1 shows structure of two security-related layers in the LTE system. As shown in FIG. 1, the Xu interface, S1-C interface, S1-U interface, and X2 interface have security requirement. In an LTE system, the base station is in a locale vulnerable to attacks. Therefore, the base station is not as secure as the Radio Network Controller (RNC) in the Universal Mobile Telecommunications System (UMTS).

In the process of base station handover between the 2G system and the 3G system, the UE needs to negotiate the security parameters as regards only the access layer with the base station in the 2G system or 3G system. In the process of base station handover from the 2G or 3G system to the LTE system, more security information needs to be negotiated between the UE and the LTE system, and a higher security level is also required. The UE needs to negotiate the security parameters as regards both the access layer and the non-access layer with the base station of the LTE system. Therefore, security is crucial for the base station handover from a 2G system or 3G system to an LTE system.

FIG. 2 is a flowchart of negotiating security between the UE and the 2G system or 3G system in the process of base station handover between the 2G system and the 3G system in the conventional art. The negotiation process includes the following steps:

Step 1: The source Base Station Subsystem (BSS) of the UE decides to initiate a handover request according to the measurement report of the UE.

Step 2: The source BSS sends the UE capability information (including the integrity protection algorithm and encryption algorithm supported by the UE) and the key information to the Serving GPRS Support Node (SGSN) of 2G system.

Step 3: The SGSN of 2G system sends the received UE capability information and the key information to the SGSN of 3G system.

Step 4: The SGSN of 3G system sends the received key information and the algorithm supported by the UE to a RNC.

Step 5: According to the received key information and the algorithm supported by the UE, the RNC selects the algorithm supported by the RNC and sends it to the SGSN of 3G system.

Step 6: The SGSN of 3G system sends the algorithm supported by the RNC to the SGSN of 2G system.

Afterward, at the time of sending a handover request acknowledgement to the source access network of the UE, the SGSN of 2G system sends the algorithm supported by the 3G SGSN to the source access network. At the time of sending a handover command to the UE, the source access network sends the algorithm to be used by the target system to the UE, thus completing security negotiation.

In the process of implementing the present invention, the inventor finds that the LTE system has two security-related strata: Non Access Stratum (NAS), and Access Stratum (AS). During handover between the 2G system and the 3G system, the security information handled at the SGSN side relates to the AS only, without relating to the NAS. Therefore, the foregoing process of negotiation between the UE and the 2G system or 3G system cannot be applied to the UE handover from the 2G system or 3G system to the LTE system. That is, no handover solution is currently available to ensure secure handover of the base station from the 2G system or 3G system to the LTE system.

SUMMARY

The embodiments of the present invention are directed to providing a method and apparatus for negotiating security during handover between different radio access technologies. When the UE hands over from a different system to an LTE system, the UE obtains the security information of the NAS and AS selected by the LTE system, and performs security negotiation with the LTE system.

The objectives of the embodiments of the present invention are fulfilled through the following technical solution.

A method for negotiating security during handover between different radio access technologies includes: transmitting the security information of the NAS and security information of AS selected by the target system to the UE when the UE hands over between different radio access technologies, so that the UE can perform security negotiation with the target system according to the security information of the NAS and security information of AS.

An eNB device includes: (1) a key and algorithm information receiving unit, adapted to receive through a handover request the following sent by a target Mobile Management Entity (MME): parameters used in NAS key derivation and algorithm information, parameters used in a eNB key derivation, the eNB key and UE capability information; (2) an algorithm selecting and key deriving unit, adapted to select a supported Radio Resources Control (RRC) encryption algorithm of the eNB, an integrity protection algorithm of the eNB, and a User Plane (UP) encryption algorithm of the eNB according to information received by the key and algorithm information receiving unit, and derive an RRC encryption key and a UP encryption key; and (3) a transparent container incorporating unit, adapted to include the following in a transparent container: parameters used in NAS key derivation and algorithm information obtained by the key and algorithm information receiving unit, parameters used in eNB key derivation, and the RRC encryption key, the UP encryption key, the RRC encryption algorithm of the eNB, the integrity protection algorithm of the eNB, and the UP encryption algorithm of the eNB that are obtained by the algorithm selecting and key deriving unit.

An eNB device includes: (1) a key and algorithm information receiving unit, adapted to receive through a handover request the following sent by a target MME: a NAS container, an eNB key ($K_{eNB}$), and UE capability information; (2) an algorithm selecting and key deriving unit, adapted to select a RRC encryption algorithm of the eNB, an integrity protection algorithm of the eNB, and a UP encryption algorithm of the eNB according to the $K_{eNB}$ and the UE capability information received by the key and algorithm information receiving unit, and derive an RRC encryption key and a UP encryption key; and (3) a transparent container incorporating unit, adapted to include parameters used in the RRC encryption key derivation and UP encryption key derivation, the RRC encryption algorithm of the eNB, the integrity protection algorithm of the eNB, and the UP encryption algorithm of the eNB obtained by the algorithm selecting and key deriving unit in an RRC container, and include the RRC container and the NAS container in a transparent container.

A source access network device includes: (1) a NAS container receiving unit, adapted to receive an NAS container sent by a target MME; (2) a RRC container incorporating unit, adapted to receive an RRC container sent by the target MME; and (3) a transparent container incorporating unit, adapted to include the NAS container received by the NAS container receiving unit and the RRC container received by the RRC container incorporating unit in a transparent container.

A target MME includes: (1) an algorithm selecting and key deriving unit, adapted to derive a NAS key ($K_{NAS}$) and an eNB key ($K_{eNB}$) according to received key information used by a source system, and select a NAS algorithm; and send the $K_{eNB}$ and UE capability information to a target eNB through a handover request; (2) an NAS container incorporating unit, adapted to include the NAS algorithm, and parameters used in $K_{NAS}$ derivation, and the parameters used in $K_{eNB}$ derivation in an NAS container; and (3) a transparent container incorporating unit, adapted to receive a RRC container sent by the target eNB; and include the RRC container and the NAS container in a transparent container.

A UE includes: (1) a unit adapted to receive a transparent container and obtain the NAS security information of and AS security information from the received transparent container; and (2) a unit adapted to perform security negotiation with the target system according to the contents in the transparent container.

The technical solution provided in the embodiments of the present invention reveals that in the embodiments of the present invention, the security information of the NAS and the security information AS is transmitted to the UE. Therefore, when the UE hands over to the LTE system, the UE obtains the security information of the NAS and the security information AS selected by the LTE system, performs security negotiation with the LTE system, and creates a security association between the UE and the LTE system.

DETAILED DESCRIPTION

A method and an apparatus for negotiating security during handover between different radio access technologies are provided in an embodiment of the present invention.

The UE handover between different radio access technologies herein includes the UE handover from a different system to an LTE system. The method and apparatus provided in the embodiments of the present invention are described below, supposing that the UE hands over from a UTRAN system to an LTE system.

In the embodiments of the present invention, when the UE hands over from the UTRAN system to the LTE system, the target MME generates NAS security information and sends the NAS security information to the target eNB. The target eNB also generates AS security information, and creates a transparent container according to the NAS security information and the AS security information.

Figure 1:
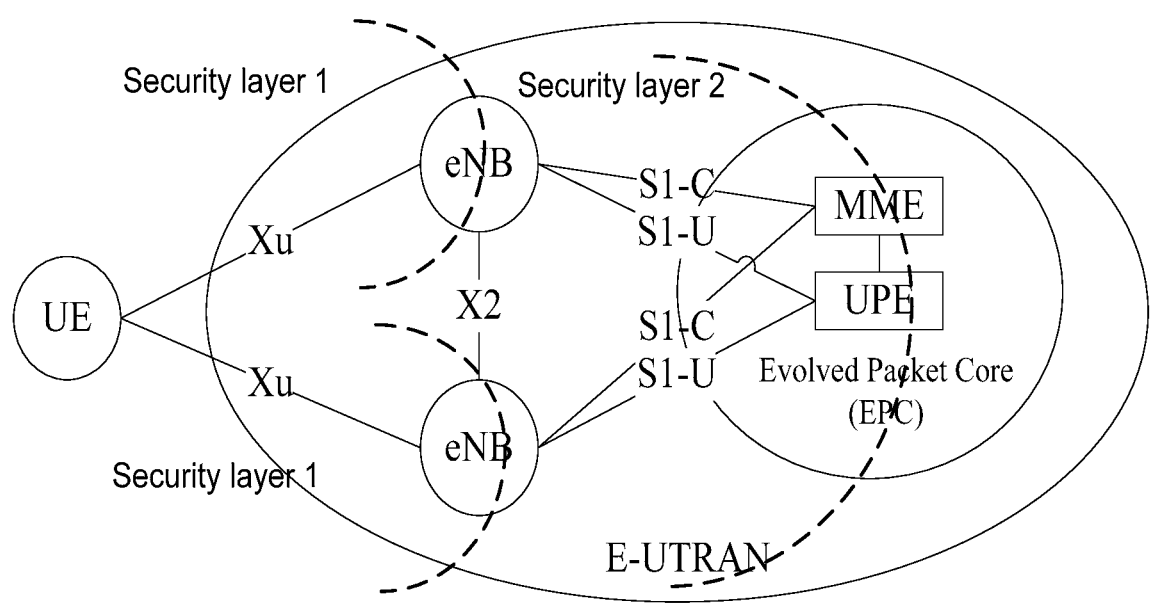
FIG. 1 shows structure of two security-related strata in the LTE system in the conventional art.
Figure 2:
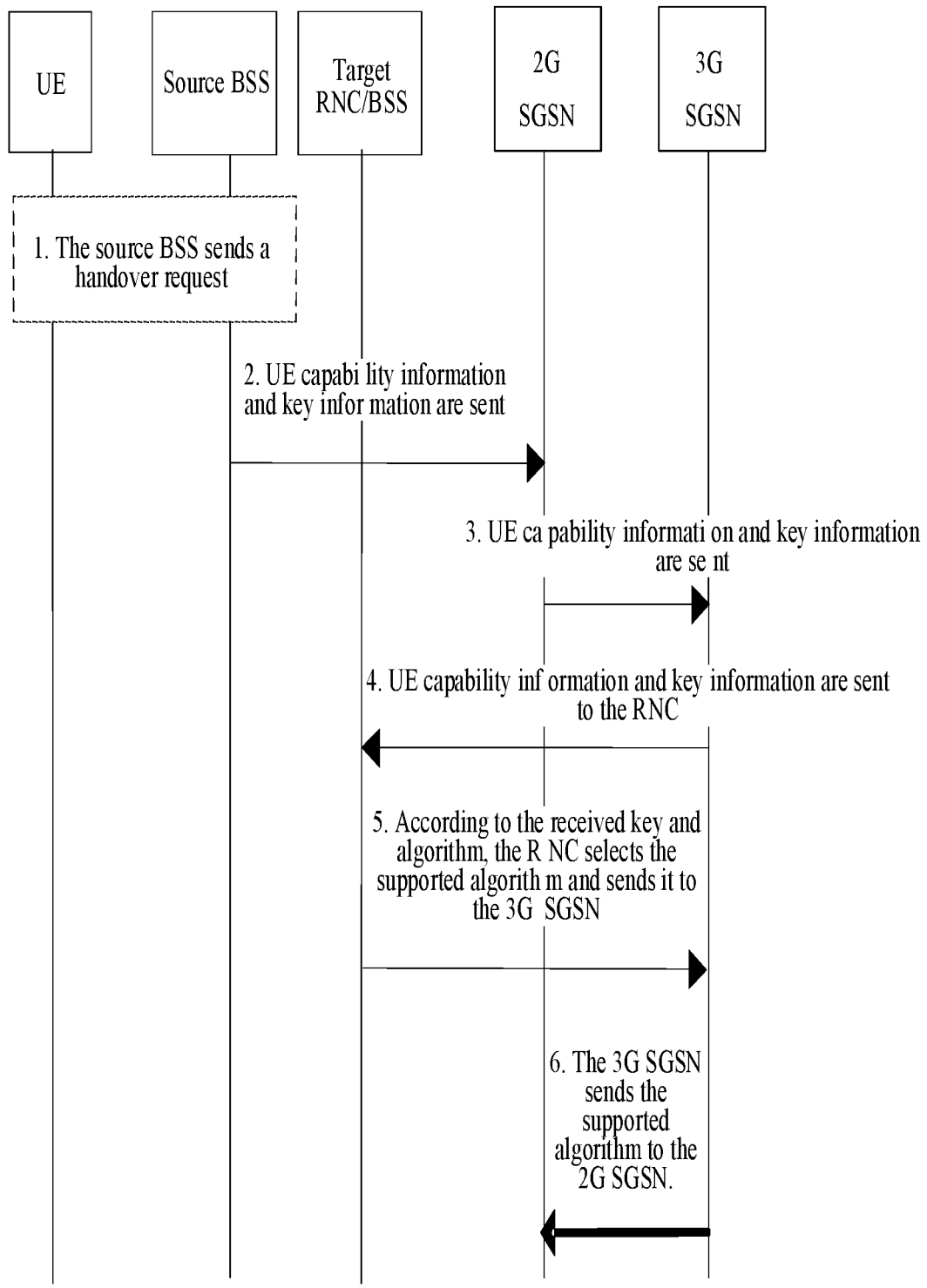
FIG. 2 is a flowchart of negotiation between the UE and the 2G system or 3G system in the process of base station handover between a 2G system and a 3G system in the conventional art.
Figure 3:
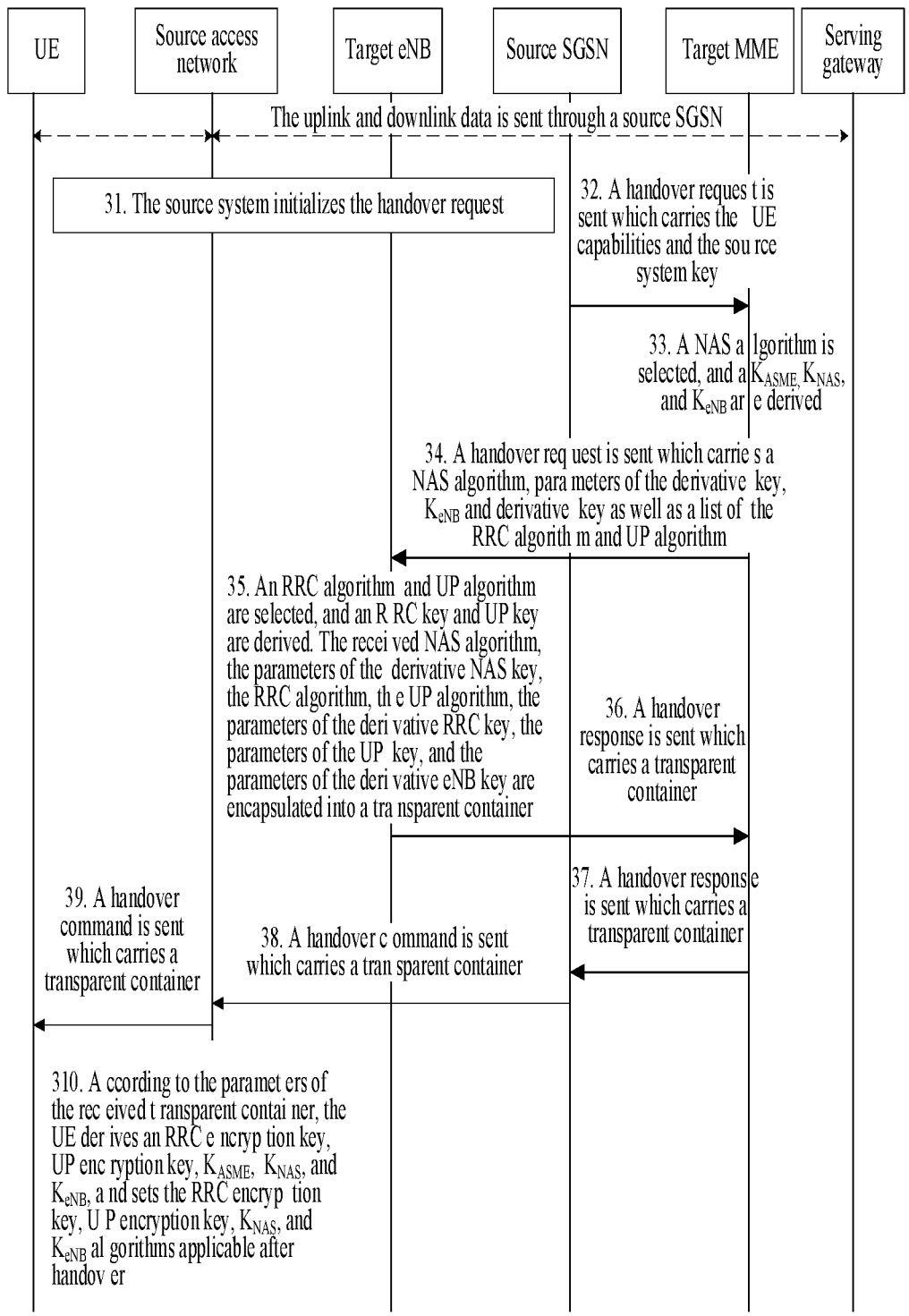
FIG. 3 is a flowchart of negotiation between a UE and an LTE system when the UE hands over from a UTRAN to an LTE system in the first embodiment of the present invention.

FIG. 3 is a flowchart of negotiating security between a UE and an LTE system when the UE hands over from a UTRAN to an LTE system in the first embodiment of the present invention. The negotiating process includes the following steps:

Step 31: First, the source system of the UE decides to perform a handover procedure, and initializes a handover request.

Step 32: The source SGSN sends the handover request to the target MME. The handover request includes the UE capability information (including a list of NAS algorithm of the UE, RRC algorithm of the UE, and UP algorithm of the UE) and the key information currently used by the source system (or the key derived by the source system according to the currently used key information).

Step 33: According to the received key information, the target MME derives an Access Security Management Entity (ASME) key $K_{ASME}$, an NAS key $K_{NAS}$, and an eNB key $K_{eNB}$, and selects an NAS algorithm.

Step 34: The target MME sends the parameters used in $K_{ASME}$ derivation, parameters used in $K_{NAS}$ derivation, parameters used in $K_{eNB}$ derivation, the $K_{eNB}$, the selected NAS algorithm, and the list of the RRC algorithm of the UE and UP algorithm of the UE to the target eNB through the handover request.

Step 35: The target eNB selects RRC encryption algorithm of the target eNB, integrity protection algorithm of the target eNB, and UP encryption algorithm of the target eNB, and derives an RRC encryption key, an integrity key, and a UP encryption key according to the received $K_{eNB}$.

The target eNB shall create a transparent container including: parameters used in the RRC encryption key derivation and the UP encryption key derivation; the received parameters used in $K_{ASME}$ derivation, parameters used in $K_{NAS}$ derivation, parameters used in $K_{eNB}$ derivation; the RRC algorithm of the UE and UP algorithm of the UE; the RRC encryption algorithm selected by the target eNB, integrity protection algorithm selected by the target eNB, and UP encryption algorithm selected by the target eNB.

Step 36: The target eNB sends the transparent container to the target MME.

Step 37: The target MME sends the transparent container to the source SGSN through a handover response.

Step 38: The source SGSN transmits the received transparent container to the source access network through a handover response.

Step 39: The source access network transmits the contents of the received transparent container to the UE through a handover command.

Step 310: According to the parameters used in the RRC encryption key derivation and the UP encryption key derivation, the parameters used in $K_{ASME}$ derivation, the parameters used in $K_{NAS}$ derivation, the parameters used in $K_{eNB}$ derivation in the received contents of the transparent container, the UE derives the RRC encryption key, UP encryption key, $K_{ASME}$, $K_{NAS}$, and $K_{eNB}$, and sets a protection algorithm applicable after handover.

Figure 4:
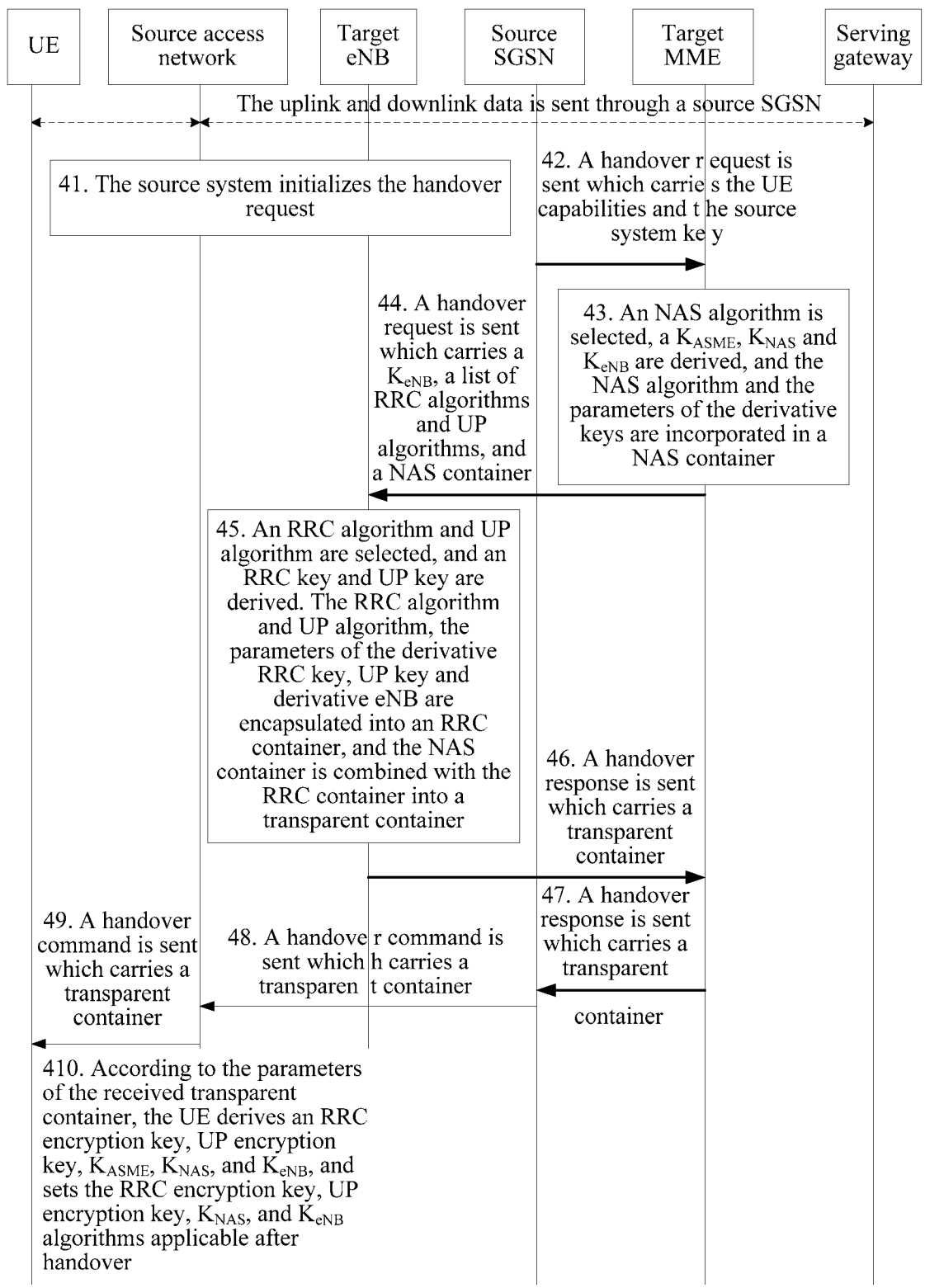
FIG. 4 is a flowchart of negotiation between a UE and an LTE system when the UE hands over from a UTRAN to an LTE system in the second embodiment of the present invention.

FIG. 4 is a flowchart of negotiating security between a UE and an LTE system when the UE hands over from a UTRAN to an LTE system in the second embodiment of the present invention. The negotiating process includes the following steps:

Step 41: First, the source system of the UE decides to perform a handover procedure, and initializes a handover request.

Step 42: The source SGSN sends the handover request to the target MME. The handover request includes the UE capability information (including a list of the NAS algorithm of the UE, RRC algorithm of the UE, and UP algorithm of the UE), and the key information currently used by the source system (or a processed key).

Step 43: According to the received key information, the target MME derives a $K_{ASME}$, a $K_{NAS}$, and a $K_{eNB}$, and selects an NAS algorithm. The target MME includes the selected NAS algorithm, parameters used in $K_{ASME}$ derivation, parameters used in $K_{NAS}$ derivation, and parameters used in $K_{eNB}$ derivation in an NAS container.

Step 44: The target MME sends the $K_{eNB}$, the list of RRC algorithm of the UE and UP algorithm of the UE, and the NAS container to the target eNB through the handover request.

Step 45: The target eNB selects the RRC encryption algorithm of the target eNB, integrity protection algorithm of the target eNB, and UP encryption algorithm of the target eNB, and derives an RRC encryption key, an integrity key, and a UP encryption key according to the received $K_{eNB}$.

The target eNB includes the following into an RRC container: parameters used in the RRC encryption key derivation and UP encryption key derivation; the RRC algorithm of the UE and UP algorithm of the UE; the RRC encryption algorithm selected by the target eNB, integrity protection algorithm selected by the target eNB, and the UP encryption algorithm selected by the target eNB. The RRC container and the received NAS container are included in a transparent container.

Step 46: The target eNB sends the transparent container to the target MME.

Step 47: The target MME sends the transparent container to the source SGSN through a handover response.

Step 48: The source SGSN transmits the received transparent container to the source access network through a handover command.

Step 49: The source access network transmits the contents of the received transparent container to the UE transparently through a handover command.

Step 410: According to the parameters used in the RRC encryption key derivation and UP encryption key derivation, the parameters used in $K_{ASME}$ derivation, the parameters used in $K_{NAS}$ derivation, and the parameters used in $K_{eNB}$ derivation in the received contents of the transparent container, the UE derives the corresponding RRC encryption key, UP encryption key, $K_{ASME}$, $K_{NAS}$, and $K_{eNB}$, and sets the relevant algorithm applicable after handover.

The process of negotiating security between a UE and an LTE system when the UE hands over from a UTRAN to an LTE system in the third embodiment of the present invention includes the following steps:

Step 51: First, the source system of the UE decides to perform a handover procedure, and initializes a handover request. Afterward, the source SGSN sends the handover request to the target MME. The handover request includes the UE capability information (including a list of the NAS algorithm of the UE, RRC algorithm of the UE, and UP algorithm of the UE), and the key information currently used by the source system (or a processed key).

Step 52: According to the received key information, the target MME derives a $K_{ASME}$, a $K_{NAS}$, and a $K_{eNB}$, and selects an NAS algorithm. The target MME includes the selected NAS algorithm, parameters used in $K_{ASME}$ derivation, parameters used in $K_{NAS}$ derivation, and parameters used in $K_{eNB}$ derivation in an NAS container. Afterward, the target MME sends the $K_{eNB}$, the list of RRC algorithm of the UE and UP algorithm of the UE, and the NAS container to the target eNB through the handover request.

Step 53: The target eNB selects RRC encryption algorithm of the target eNB, integrity protection algorithm of the target eNB, and UP encryption algorithm of the target eNB, and derives an RRC encryption key, an integrity key, and a UP encryption key according to the received $K_{eNB}$.

Afterward, the target eNB includes the following contents in a transparent container: parameters used in the RRC encryption key derivation and UP encryption key derivation; the RRC algorithm of the UE and UP algorithm of the UE; the RRC encryption algorithm selected by the target eNB, integrity protection algorithm selected by the target eNB, the UP encryption algorithm selected by the target eNB, and the received NAS container. Then, the target eNB sends the transparent container to the target MME.

Step 54: The target MME sends the transparent container to the source SGSN through a handover response. The source SGSN transmits the received transparent container to the source access network through a handover command. The source access network transmits the contents of the received transparent container to the UE through a handover command.

Step 55: According to the parameters used in the RRC encryption key derivation and UP encryption key derivation, the parameters used in $K_{ASME}$ derivation, the parameters used in $K_{NAS}$ derivation, and parameters used in $K_{eNB}$ derivation in the received contents of the transparent container, the UE derives the RRC encryption key, UP encryption key, $K_{ASME}$, $K_{NAS}$, and $K_{eNB}$, and sets the relevant algorithm applicable after handover.

The process of negotiating security between a UE and an LTE system when the UE hands over from a UTRAN to an LTE system in the fourth embodiment of the present invention includes the following steps:

Step 61: First, the source system of the UE decides to perform a handover procedure, and initializes a handover request. Afterward, the source SGSN sends the handover request to the target MME. The handover request includes the UE capability information (including a list of the RRC algorithm of the UE, and UP algorithm of the UE) and the key information currently used by the source system (or a processed key).

Step 62: According to the received key information, the target MME derives a $K_{ASME}$, a $K_{NAS}$, and a $K_{eNB}$, and selects an NAS algorithm.

Afterward, the target MME sends the list of the RRC algorithm of the UE and UP algorithm of the UE as well as the $K_{eNB}$ to the target eNB. The target MME includes the selected NAS algorithm, parameters used in $K_{ASME}$ derivation, parameters used in $K_{NAS}$ derivation, and parameters used in $K_{eNB}$ derivation in an NAS container, and sends the NAS container to the source access network through the source SGSN.

Step 63: The target eNB selects RRC encryption algorithm of the target eNB, integrity protection algorithm of the target eNB, and UP encryption algorithm of the target eNB; and derives an RRC encryption key, an integrity key, and a UP encryption key according to the received $K_{eNB}$.

The target eNB includes the following in an RRC container: parameters used in the RRC encryption key derivation and UP encryption key derivation; the RRC algorithm of the UE and UP algorithm of the UE; the RRC encryption algorithm selected by the target eNB and integrity protection algorithm selected by the target eNB, and the UP encryption algorithm selected by the target eNB. Then, the target eNB sends the contents of the RRC container to the target MME.

Step 64: The target MME sends the contents of the RRC container to the source SGSN through a handover response, and the source SGSN transmits the received RRC container to the source access network through a handover command.

The source access network sends the contents of the received NAS container and the contents of the RRC container to the UE.

Step 65: According to the parameters used in the RRC encryption key derivation and UP encryption key derivation, the parameters used in $K_{ASME}$ derivation, the parameters used in $K_{NAS}$ derivation, and the parameters used in $K_{eNB}$ derivation in the contents of the received NAS container and RRC container, the UE derives the corresponding RRC encryption key, UP encryption key, $K_{ASME}$, $K_{NAS}$, and $K_{eNB}$, and sets the relevant algorithm applicable after handover.

The process of negotiating security between a UE and an LTE system when the UE hands over from a UTRAN to an LTE system in the fifth embodiment of the present invention includes the following steps:

Step 71: First, the source system of the UE decides to perform a handover procedure, and initializes a handover request. Afterward, the source SGSN sends a handover request to the target MME. The handover request includes the UE capability information (including a list of the RRC algorithm of the UE, and UP algorithm of the UE), and the key information currently used by the source system (or a processed key).

Step 72: According to the received key information, the target MME derives a $K_{ASME}$, a $K_{NAS}$, and a $K_{eNB}$, and selects an NAS algorithm.

The target MME sends the UE capability information and $K_{eNB}$ to the target eNB, and includes parameters used in $K_{ASME}$ derivation, parameters used in $K_{NAS}$ derivation, and parameters used in $K_{eNB}$ derivation as well as the NAS algorithm in an NAS container.

Step 73: The target eNB selects RRC encryption algorithm of the target eNB, integrity protection algorithm of the target eNB, and UP encryption algorithm of the target eNB; and derives an RRC encryption key, an integrity key, and a UP encryption key according to the received $K_{eNB}$.

The target eNB includes parameters used in the RRC encryption key derivation and UP encryption key derivation, the RRC encryption algorithm of the target eNB, integrity protection algorithm of the target eNB and UP encryption algorithm of the target eNB in an RRC container, and sends the RRC container to the target MME. The target MME includes the RRC container and the NAS container in a transparent container, and sends the transparent container to the source access network through a source SGSN.

The source access network sends the contents of the received transparent container to the UE.

Step 74: According to the parameters used in the RRC encryption key derivation and UP encryption key derivation, the parameters used in $K_{ASME}$ derivation, the parameters used in $K_{NAS}$ derivation, and the parameters used in $K_{eNB}$ derivation in the contents of the received NAS container and RRC container, the UE derives the corresponding RRC encryption key, UP encryption key, $K_{ASME}$, $K_{NAS}$, and $K_{eNB}$, and sets the relevant algorithm applicable after handover.

The processes of the embodiment 1, embodiment 2, embodiment 3 and embodiment 4 suppose that the UE hands over from the UTRAN to the LTE system, and are also applicable to the scenario of handover from a 2G network to an LTE network, where both the 2G network and the 3G network are called a Packet Switched (PS) domain.

If the UE hands over from a Circuit Switched (CS) domain of the 2G/3G to an LTE system, the process of security negotiation between the UE and the LTE network needs to be decided according to the specific handover process of the UE.

When the UE hands over from the CS domain of the 2G/3G system to the LTE system, if the UE is disconnected from the CS domain of the 2G/3G system and then connected with the LTE system again, the UE may perform an Authentication and Key Agreement (AKA) process with the LTE system directly, and then obtain the corresponding NAS security information and AS security information from the LTE system.

When the UE hands over from the CS domain of the 2G/3G system to the LTE system, if the UE hands over from the CS domain of the 2G/3G system to the PS domain of the 2G/3G system and then hands over to the LTE system smoothly, the process of security association negotiated between the UE and LTE system is the same as that in the foregoing process of handover from the PS domain of the 2G/3G system to the LTE system.

When the UE hands over from the CS domain of the 2G/3G system to the LTE system, if the UE hands over from the CS domain of the 2G/3G system to the LTE system, the security association negotiated between the UE and the LTE system is transferred through a Mobile Services Switching Center (MSC) node and a target MME, thus facilitating the UE to obtain the corresponding NAS security information and AS security information.

When the UE hands over from the CS domain of the 2G/3G system to the LTE system, if the UE hands over from the IP Multimedia Subsystem (IMS) on the CS domain of the 2G/3G system to the LTE system first, the security association negotiated between the UE and the LTE system is transferred through a Call Session Control Function (CSCF) node of the IMS and a target MME, thus facilitating the UE to obtain the corresponding NAS security information and AS security information.

Figure 5:
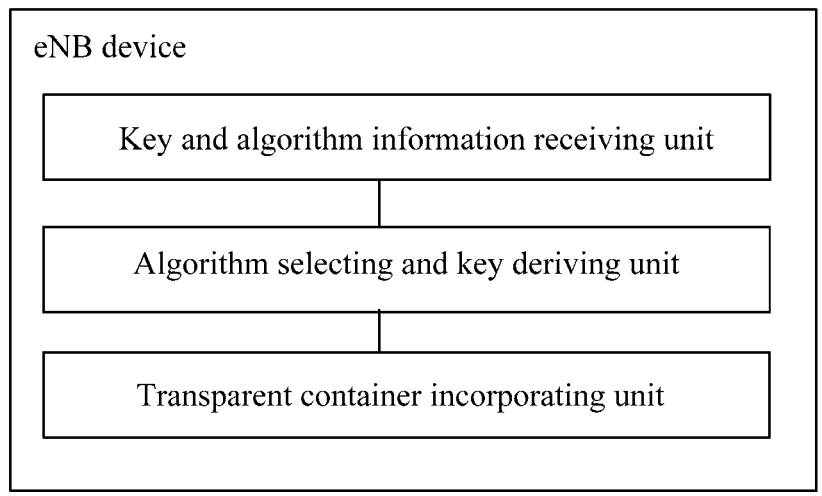
FIG. 5 shows structure of an eNB device provided in an embodiment of the present invention.

As shown in FIG. 5, an eNB device provided in an embodiment of the present invention includes: (1) a key and algorithm information receiving unit, adapted to receive through a handover request the following sent by a target Mobile Management Entity (MME): parameters used in Non Access Stratum (NAS) key derivation and algorithm information, parameters used in a eNB key derivation, the eNB key and User Equipment (UE) capability information; (2) an algorithm selecting and key deriving unit, adapted to select RRC encryption algorithm of the eNB, integrity protection algorithm of the eNB, and UP encryption algorithm of the eNB according to the information received by the key and algorithm information receiving unit, and derive an RRC encryption key and a UP encryption key; and (3) a transparent container incorporating unit, adapted to includes the following in a transparent container: the parameter and algorithm information of the NAS key and the parameter and algorithm information of the AS key obtained by the key and algorithm information receiving unit; and the RRC encryption key, UP encryption key, RRC encryption algorithm of the eNB, integrity protection algorithm of the eNB, and UP encryption algorithm of the eNB that are obtained by the algorithm selecting and key deriving unit.

An eNB device is provided in an embodiment of the present invention. As shown in FIG. 5, the eNB device includes: (1) a key and algorithm information receiving unit, adapted to receive through a handover request the following sent by a target Mobile Management Entity (MME): a Non Access Stratum (NAS) container, an eNB key ($K_{eNB}$), and User Equipment (UE) capability information sent; (2) an algorithm selecting and key deriving unit, adapted to select RRC encryption algorithm of the eNB, integrity protection algorithm of the eNB, and UP encryption algorithm of the eNB according to the $K_{eNB}$ and UE capability information received by the key and algorithm information receiving unit, and derive an RRC encryption key and a UP encryption key; and (3) a transparent container incorporating unit, adapted to include parameters used in the RRC encryption key derivation and UP encryption key derivation, RRC encryption algorithm of the eNB, integrity protection algorithm of the eNB, and UP encryption algorithm of the eNB obtained by the algorithm selecting and key deriving unit in an RRC container; and include the RRC container and the NAS container in a transparent container.

Figure 6:
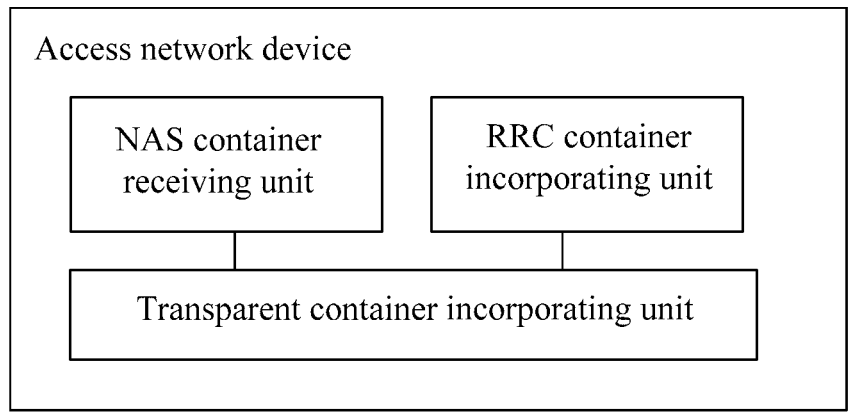
FIG. 6 shows structure of an access network device provided in an embodiment of the present invention.

A source access network device is provided in an embodiment of the present invention. As shown in FIG. 6, the source access network device includes: (1) an NAS container receiving unit, adapted to receive an NAS container sent by the target MME; (2) an RRC container incorporating unit, adapted to receive an RRC container sent by the target MME; and (3) a transparent container incorporating unit, adapted to include the NAS container received by the NAS container receiving unit and the RRC container received by the RRC container incorporating unit in a transparent container.

Figure 7:
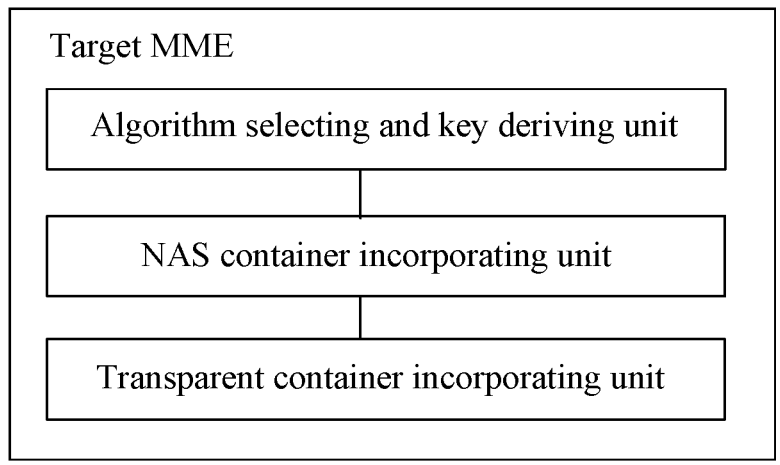
FIG. 7 shows structure of a target MME provided in an embodiment of the present invention.

A target MME is provided in an embodiment of the present invention. As shown in FIG. 7, the target MME includes: (1) an algorithm selecting and key deriving unit, adapted to derive a $K_{NAS}$ and a $K_{eNB}$ according to the received key information used by the source system, and select an NAS algorithm; and send the $K_{eNB}$ and UE capability information to the target eNB through a handover request; (2) an NAS container incorporating unit, adapted to include the NAS algorithm, and the parameters used in $K_{NAS}$ derivation, and the parameters used in $K_{eNB}$ derivation in an NAS container; and (3) a transparent container incorporating unit, adapted to receive the RRC container sent by the target eNB, and include the RRC container and the NAS container in a transparent container.

To sum up, in the embodiments of the present invention, the security information of the NAS and AS is transmitted to the UE. Therefore, when the UE hands over from a 3G or 2G system, such as Universal Terrestrial Radio Access Network (UTRAN), to the LTE system, the UE obtains the security information of the NAS and AS selected by the LTE system, performs security negotiation with the LTE system, and creates a security correlation between the UE and the LTE system.

Furthermore, a transparent container may be generated out of the security information of the NAS and AS selected by the LTE system, the capability information supported by the UE, and the encryption algorithm selected by the target eNB, and the transparent container is transmitted to the UE. Therefore, when the UE hands over from the UTRAN to the LTE system, the UE obtains the parameter information of the NAS key and AS key selected by the LTE system, and the encryption algorithm selected by the target eNB. The UE negotiates the NAS and AS security parameters and the security algorithm between the LTE system and a different system without adding any signaling, and a security correlation is created between the UE and the LTE system.

The embodiments of the present invention are compatible with the handover signaling flow between the 2G system and the 3G system, and implement negotiation of the NAS and AS security parameters and the security algorithm between the LTE system and a different system without adding any extra signaling.

It is understandable to those skilled in the art that the processes in the foregoing embodiments may be implemented by hardware instructed by a program. The program may be stored in a readable storage medium. Once being executed, the program performs the steps covered by the foregoing methods. The storage medium may be a ROM/RAM, magnetic disk or compact disk.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:
1. A method for a handover from a source system to a target system, the method comprising:
  selecting, by a mobility management network device in the target system, non access stratum (NAS) security information;

sending, by the mobility management network device, the NAS security information to a base station in the target system;
receiving, by the mobility management network device from the base station, a transparent container including the NAS security information and access stratum (AS) security information; and
sending, by the mobility management network device, the transparent container to a user equipment through the source system.

2. The method according to claim 1, further comprising:
receiving, by the mobility management network device, key information from the source system, wherein the key information is for derivation of an access security management entity key; and
sending, by the mobility management network device to the base station, a parameter used in the derivation of the access security management entity key.

3. The method according to claim 1, further comprising:
receiving, by the mobility management network device, user equipment capability information from the source system; and
sending, by the mobility management network device, the user equipment capability information to the base station.

4. The method according to claim 1, further comprising:
receiving, by the base station, the NAS security information from the mobility management network device;
selecting, by the base station, the AS security information;
including, by the base station, the NAS security information and the AS security information in the transparent container; and
sending, by the base station, the transparent container to the mobility management network device.

5. The method according to claim 1, further comprising:
receiving, by the base station, a base station key and a parameter used in a derivation of the base station key from the mobility management network device, wherein the transparent container further includes the parameter used in the derivation of the base station key.

6. The method according to claim 1, wherein sending the NAS security information to the base station comprises:
sending, by the mobility management network device, a handover request message including the NAS security information to the base station.

7. The method according to claim 1, wherein receiving the transparent container comprises:
receiving, by the mobility management network device, a handover response message including the transparent container from the base station.

8. The method according to claim 1, further comprising:
sending, by the source system, the transparent container to the user equipment.

9. The method according to claim 1, wherein the transparent container includes an NAS container containing the NAS security information.

10. The method according to claim 1, wherein a first radio access technology supported by the source system and a second radio access technology supported by the target system are different.

11. The method according to claim 1, wherein the NAS security information comprises a NAS algorithm, and the AS security information comprises an encryption algorithm.

12. A mobility management network device, comprising:
a processor; and
a memory coupled to the processor and storing processor-executable instructions;
wherein, based on execution of the processor-executable instructions by the processor, the mobility management network device is configured to:
select non access stratum (NAS) security information;
send the NAS security information to a base station in a target system of a handover;
receive, from the base station, a transparent container including the NAS security information and access stratum (AS) security information; and
send the transparent container to a user equipment through a source system of the handover.

13. The mobility management network device according to claim 12, wherein, based on execution of the processor-executable instructions by the processor, the mobility management network device is further configured to:
receive key information from the source system, wherein the key information is for derivation of an access security management entity key; and
send the NAS security information and a parameter used in the derivation of the access security management entity key to the base station.

14. The mobility management network device according to claim 12, wherein, based on execution of the processor-executable instructions by the processor, the mobility management network device is further configured to:
receive user equipment capability information from the source system; and
send the user equipment capability information to the base station.

15. The mobility management network device according to claim 12, wherein, based on execution of the processor-executable instructions by the processor, the mobility management network device is further configured to:
send the NAS security information to the base station through a handover request message.

16. The mobility management network device according to claim 12, wherein, based on execution of the processor-executable instructions by the processor, the mobility management network device is further configured to:
receive the transparent container from the base station through a handover response message.

17. The mobility management network device according to claim 12, wherein the NAS security information comprises a NAS algorithm, and the AS security information comprises an encryption algorithm.

18. A base station, comprising:
a processor; and
a memory coupled to the processor and storing processor-executable instructions;
wherein, based on execution of the processor-executable instructions by the processor, the base station is configured to:
receive non access stratum (NAS) security information from a mobility management network device in a target system of a handover;
select access stratum (AS) security information; and
send a transparent container including the NAS security information and the AS security information to a user equipment through the mobility management network device and a source system of the handover.

19. The base station according to claim 18, wherein, based on execution of the processor-executable instructions by the processor, the base station is further configured to:
receive a base station key and a parameter used in a derivation of the base station key from the mobility management network device, wherein the transparent container further includes the parameter used in the derivation of the base station key.

20. The base station according to claim 18, wherein, based on execution of the processor-executable instructions by the processor, the base station is further configured to:
receive user equipment capability information from the mobility management network device.

21. The base station according to claim 18, wherein the NAS security information comprises a NAS algorithm, and the AS security information comprises an encryption algorithm.

22. A communication system comprising:
a mobility management network device; and
a base station;
wherein the mobility management network device is configured to select non access stratum (NAS) security information and send the NAS security information to the base station;
wherein the base station is configured to:
receive the NAS security information;
select access stratum (AS) security information; and
send a transparent container including the NAS security information and the AS security information to the mobility management network device; and
wherein the mobility management network device is further configured to, upon receiving the transparent container from the base station, send the transparent container to a user equipment through a source system of a handover.

23. The communication system according to claim 22, wherein the mobility management network device is further configured to:
receive key information from the source system;
derive an access security management entity key, an NAS key and a base station key according to the key information from the source system; and
send the base station key and a parameter used in the derivation to the base station;
wherein the base station is further configured to add the parameter used in the derivation into the transparent container.

24. The communication system according to claim 22, wherein the mobility management network device is further configured to:
receive, from the source system, key information for derivation of an access security management entity key; and
send, to the base station, the NAS security information and a parameter used in the derivation of the access security management entity key.

25. The communication system according to claim 22, wherein the NAS security information comprises a NAS algorithm, and the AS security information comprises an encryption algorithm.

* * * * *

UNITED STATES PATENT AND TRADEMARK OFFICE
CERTIFICATE OF CORRECTION

| | | |
|---|---|---|
| PATENT NO. | : 11,576,089 B2 | Page 1 of 1 |
| APPLICATION NO. | : 17/119633 | |
| DATED | : February 7, 2023 | |
| INVENTOR(S) | : Xu et al. | |

It is certified that error appears in the above-identified patent and that said Letters Patent is hereby corrected as shown below:

On the Title Page

Item (30), the following foreign application priority data section should be added:
-- Foreign Application Priority Data
May 15, 2007 (CN) ....................... 200710099176.7 --.

Item (56), the following identifications of foreign patent documents should be added to the FOREIGN PATENT DOCUMENTS section:
-- CN 1193449 A 9/1998
CN 1321049 A 11/2001
CN 1481651 A 3/2004
CN 1614930 A 5/2005
CN 1937825 A 3/2007
CN 101005489 A 7/2007
CN 101022647 A 8/2007
CN 101304600 B 12/2011
CN 101309500 B 7/2011 --.

Signed and Sealed this
Thirteenth Day of June, 2023

Katherine Kelly Vidal
*Director of the United States Patent and Trademark Office*